No. 11,791. Reissued Nov. 21, 1899.
G. BROWN & E. DICK.
AUTOMATIC TENSION GOVERNOR FOR WARP BEAMING MACHINES.
(Application filed Jan. 27, 1899.)
2 Sheets—Sheet 1.
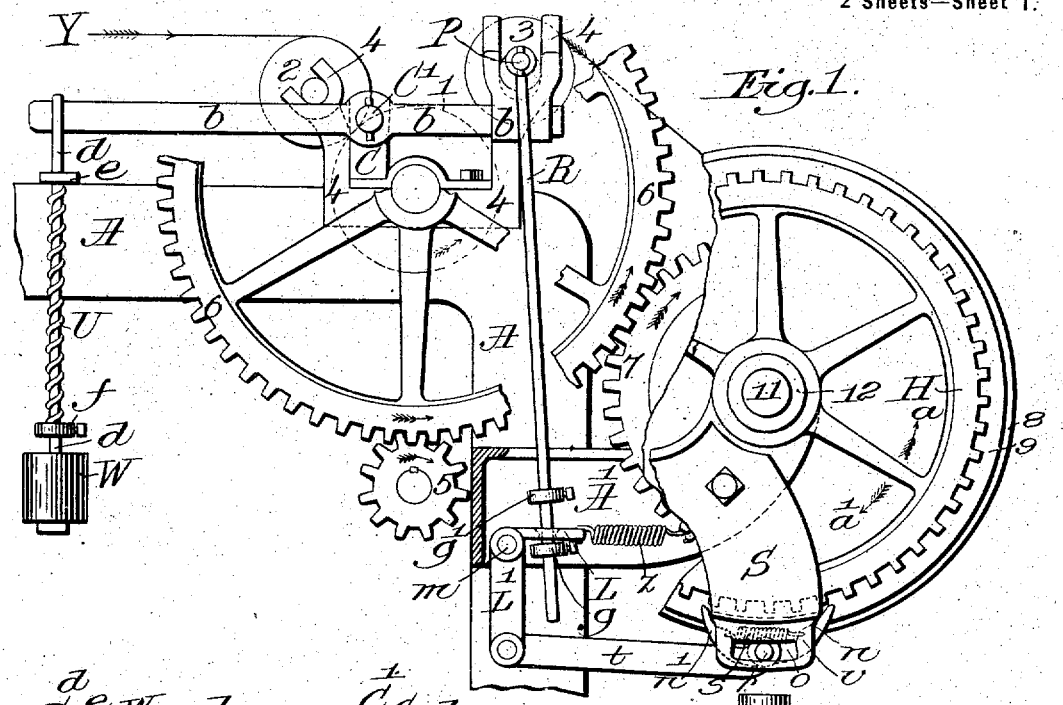
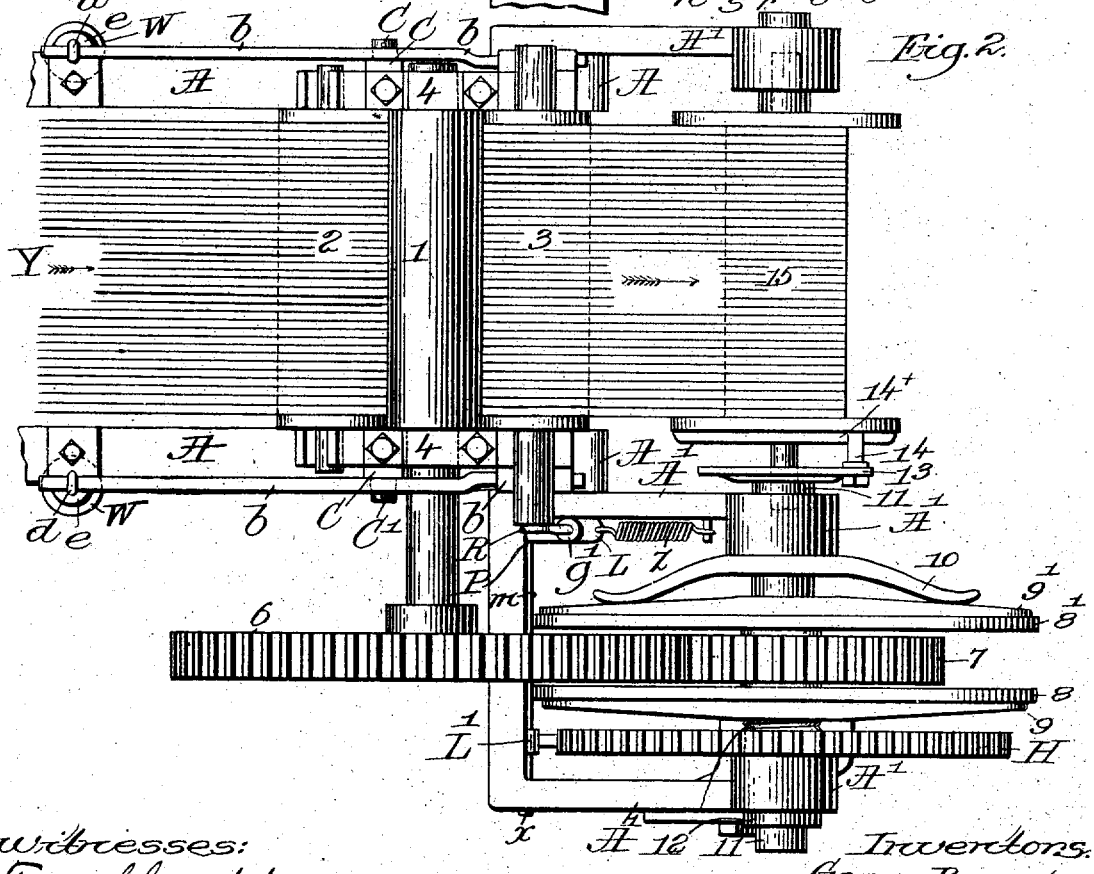
Witnesses:
Fred S. Grundy.
Edward F. Allen.
Inventors.
George Brown,
Emil Dick.
by Crosby Gregory Attys.
THE ECKERT LITHOGRAPHING CO., WASHINGTON, D. C.

No. 11,791. Reissued Nov. 21, 1899.
G. BROWN & E. DICK.
AUTOMATIC TENSION GOVERNOR FOR WARP BEAMING MACHINES.
(Application filed Jan. 27, 1899.)
2 Sheets—Sheet 2.
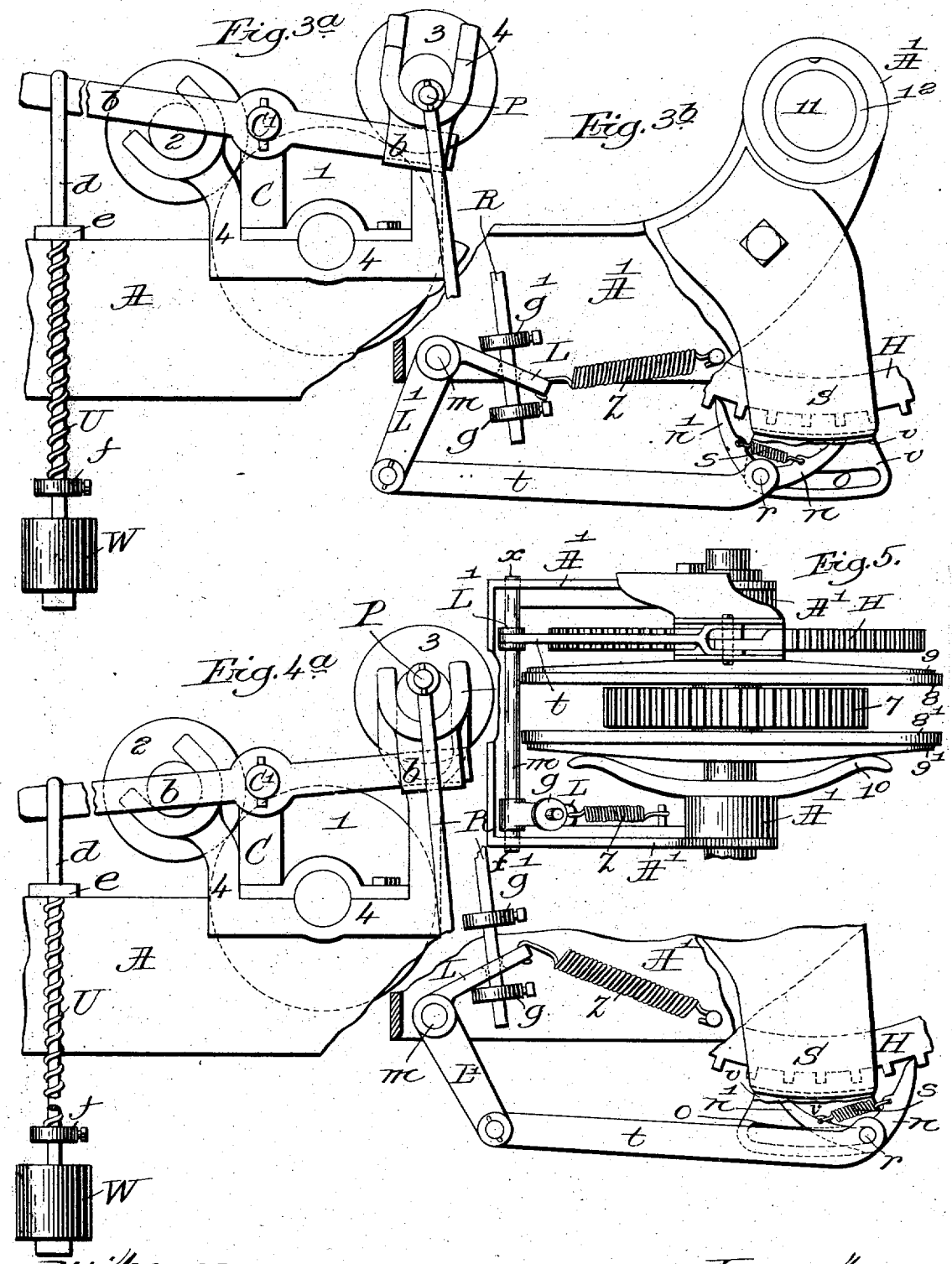
Witnesses:
Fred S. Grundy
Edward F. Allen.
Inventors.
George Brown,
Emil Dick,
by Crosby, Gregory & Kings.
THE ECKERT LITHOGRAPHING CO., WASHINGTON, D. C.

UNITED STATES PATENT OFFICE.

GEORGE BROWN AND EMIL DICK, OF AUBURN, MAINE.

AUTOMATIC TENSION-GOVERNOR FOR WARP-BEAMING MACHINES.

SPECIFICATION forming part of Reissued Letters Patent No. 11,791, dated November 21, 1899.

Original No. 613,004, dated October 25, 1898. Application for reissue filed January 27, 1899. Serial No. 703,632.

*To all whom it may concern:*

Be it known that we, GEORGE BROWN and EMIL DICK, citizens of the United States, residing at Auburn, Maine, have invented certain new and useful Improvements in Automatic Tension-Governors for Warp-Beaming Machines, of which the following is a specification.

Our invention relates to the controlling of the tension of yarn during the process of winding or beaming, the object being to automatically govern the tension of the yarn during this process, so that the machine being once adjusted the yarn shall be wound in slashing or beaming on the one hand without being subjected to too great strain and on the other without making the warp too soft for practical use. Heretofore the tension upon the yarn during this process of winding, slashing, or beaming has been regulated by hand at the will of the operator and in accordance with his judgment, based with more or less accuracy upon touch. This variation is brought about by means of a hand-wheel, through which the operator increases or lessens the pressure on friction-disks, which communicate power to the drum upon which the yarn is wound. In our invention the tension of the yarn is caused to act upon the screw or other device, which increases or diminishes this frictional contact, and by the use of this strain of the yarn the slightest variation in its tension is made to operate immediately and automatically to vary the friction, and at the same time any variation in the friction will find its compensation in the action of the tension apparatus. If, for example, the friction-disks become heated so as to stick or adhere together, the relaxation will cause the release of the screw-pressure. Thus a tension which can be mathematically figured out can at all times be maintained without depending upon the judgment of the attendant and regardless of any defects in the friction-disks or other causes.

Our invention is illustrated in the accompanying drawings, which show only so much of the winding mechanism as is necessary to illustrate the invention.

In the drawings, Figure 1 represents in side elevation the automatic tension devices, including the drum and the rolls over which the yarn passes. Fig. 2 is a plan view of the same. Figs. $3^a$ and $3^b$ represent the details of construction on a larger scale and show the position of levers and pawls caused by an abnormally low position of the governing-roll. Figs. $4^a$ and $4^b$ are further illustrations showing the different positions of the parts illustrated in Figs. $3^a$ and $3^b$. Fig. 5 is a bottom plan view showing more clearly the friction devices and illustrating other details of construction.

In the drawings the part of the main frame which supports the working parts necessary to be described is shown at A. Mounted in this frame or in bearings fixed upon it are rolls 1 and 2, belonging to the series of rolls which pull the yarn Y. A third roll of this series (marked 3) is mounted in bearings upon levers *b*, which are pivoted on the main frame, one being provided for each end of the roll 3, as shown in Fig. 2. The levers are directly pivoted on studs C′, which are on standards C.

In the winding the yarn is drawn in the direction of the arrows, Figs. 1 and 2, and passes over roll 2, under the roll 1, and out over the roll 3 to the warp-beam 15. The roll 1 carries a gear-wheel 6 and is driven by a pinion 5 on the belt-shaft. The gear-wheel 6 also meshes with a gear-wheel 7, which is loose on the shaft 11, carrying the warp-beam 15. Fixed to the gear-wheel 7 are the friction-disks 8 and 8′, all loose on the shaft 11. Fixed on the same shaft by means of splines are the disks 9 9′, and when pressure is applied to the outside disk 9 the frictional contact between it and the disk 9′, applied to the shaft through the wheel 7, causes the shaft to revolve and with it the beam 15. The motion from the shaft to the beam is communicated by means of a face-plate 13 and stud 14, said stud engaging against any suitable projection $14^x$ on the head of the warp-beam. The hand-wheel H is mounted upon the shaft 11. Its hub is internally threaded to engage with an externally-threaded non-rotary and longitudinally-reciprocable sleeve 12, bearing against the friction-disk 9. The outside of the wheel H bears against the part A′ of the frame, so that when the wheel H is turned in direction *a* it forces the disk 9 inwardly, so as to apply pressure through the disk upon the wheel 7, this causing an increase of driving force and consequently an increase of tension in the yarn that is wound upon the beam. Reverse movement of the wheel H in direction $a'$ will of course relax the frictional contact, and thus diminish the tension. A bow-spring 10 is shown in Fig. 2 as interposed between the inner arm A′ and the inner disk.

The frictional connections by which the power is transmitted are not claimed as a part of our invention, and, in fact, other devices may be substituted therefor. These are used in the hand regulation when the wheel H is used as a hand-wheel.

The automatic regulation, which is the object sought in our invention, is accomplished by motion transmitted from the movable roll 3, heretofore mentioned as having its bearings in the levers $b$. It will be observed that the strain of the warp passing over this roll 3 tends to force it downward and to depress the ends of the levers upon which the roll is mounted. On the outer ends of these levers are tension devices, which consist of weights and springs. The weight is shown at W, and there is one on the lower end of each rod $d$, which is suspended from the outer end of each lever. The rods pass through ears $e$ on the frame and have adjustable collars $f$. Between these collars and the ears $e$ are springs U, which tend normally to draw down the outer ends of the levers and so force the roll 3 upward against the strain of the yarn. The tension of the springs may be regulated by adjustment of the collars $f$, or the pull may be increased by increasing the weight. The roll 3 is turned by the warp which passes over it and with greater or less force, according to the tension of the warp. On the end of the arbor of the roll 3 is placed eccentrically a wrist-pin P. To this is connected a pitman R, carrying on its lower ends adjustable collars $g'$ and $g$. These collars are on the upper and lower sides of an arm L of the bell-crank lever L′, through which the pitman passes. The bell-crank lever is pivoted at $m$, and its upper end is connected by a spring $z$ to a fixed pin on the frame. The lower end of the bell-crank lever L′ is connected by a bar $t$ to a pawl mechanism. The end of the bar $t$ carries a pin $r$, on which are pivoted the two pawls $n$ $n'$. The pin $r$ projects through a slot $o$ in cheek-pieces $v$ on a shield S, which is bolted to the frame outside of the wheel. The slot is parallel with the periphery of the wheel H and serves to guide the pawls, so that one or the other may operate upon the wheel in the manner indicated in Figs. 3[b] and 4[b]. When one pawl is in position to engage with the teeth on the periphery of the wheel H, the other pawl rides on the edge of the shield S, as shown in the said figures. The pawls are connected and held in place by a spring $s$. The pawls are operated by reciprocating movement of the bar $t$, and the position of the bell-crank lever L′, whether it be as shown in Fig. 3[b] or Fig. 4[b], determines which pawl will operate and therefore in which direction the wheel will be turned and whether the frictional contact be increased or lessened.

The position of the bell-crank lever is determined by the position of the roll 3. If the said roll be depressed by reason of abnormal tension upon the yarn, then the pitman-rod R will be pushed down, so that the upper collar $g'$ thereon will press on the upper side of the arm L and throw back the lower part of the bell-crank lever. In this position the operation of the wrist-pin P will cause reciprocation of the bar $t$ and will act through the pawl $n'$, which is brought into action by this position of the bell-crank lever to turn back the wheel, and thus release the screw pressure and friction, and this also determines the pull upon the warp. If, on the other hand, the strain upon the warp is abnormally light, it will permit the spring and weight to throw up the roll 3 and raise the bell-crank lever L′ into position in Fig. 4[b], in which the pawl $n$ is in engagement, the other pawl riding on the edge of the shield. The reciprocation caused, as before, by the action of the collar $g$ and spring $z$ will give forward motion to the wheel and turn the screw to increase the pressure on the disks and increase, therefore, the strain upon the yarn by acceleration of the winding-drum. The arms L and L′, which constitute the bell-crank lever, are located at different points on the shaft $m$, which has its bearings in the frame. An intermediate position of the roll 3 will bring both pawls out of engagement and render the device for increasing or diminishing the pressure inoperative, and the operation on either side of the extremes will be increased in proportion as the strain is greatest or least and the position of the roll 3 consequently at its lowest or highest limit. Thus the tendency of the apparatus is constantly to prevent any extremes of tension and to maintain an amount invariable, but determined by the tension of weight or spring applied to the outer end of the lever $b$.

Having described our invention, what we claim, and desire to secure by Letters Patent, is—

1. In combination, a roll turning in fixed bearings and a roll turning in movable bearings, arranged to receive the yarn, tension means acting on the movable roll against the strain of the yarn, a winding-drum, means, including friction mechanism, for forwardly rotating the winding-drum to wind on the yarn, automatic mechanism for controlling the friction-pressure of the drum-turning mechanism, including devices to positively engage and operate the friction mechanism and moved by movement of the movable roll to positively increase or positively diminish the said friction, by the shifting in position of the said roll, substantially as described.

2. A machine for winding or beaming yarn, &c., comprising a winding-drum, friction mechanism for rotating said drum to wind on the yarn, a tension mechanism engaged and operated by the yarn in passing to the winding-drum and including a roll mounted in stationary bearings, and a roll turning about said other roll and being moved up and down by the strain of the yarn, said yarn passing under one roll and over the other roll, and positive engaging and operating connections, including a rod, between said friction mechanism and said tension mechanism for positively operating the former by the latter, said rod being shifted by the movement of said movable roll, moving said friction mechanism in one direction to diminish the friction and in the other direction to increase the friction, substantially as described.

3. In combination, a roll turning in fixed bearings, and a roll turning in movable bearings, arranged to receive the yarn, tension means acting on the movable roll against the strain of the yarn, a rod reciprocated by the turning of the movable roll, said rod having adjustable collars, a lever adapted to be acted upon by one of said collars when the movable roll is in one position and the other when the roll is in another position, a drum for the yarn, mechanism for operating said drum, including a friction-clutch, and a connection from said lever to said clutch whereby the movement of the lever governs the friction of the clutch, substantially as described.

4. In combination, the drum, the driving-wheel therefor, frictional devices interposed between said driving-wheel and drum, a toothed wheel for controlling said frictional devices, spring-controlled pawls adapted to act on said wheel singly and in opposition, a bar for reciprocating said pawls, a bell-crank lever having one end connected with said bar, tension means for operating the bell-crank in one direction, a roll journaled in movable bearings and operated by the varying tension on the yarn, and a rod reciprocated by said roll and having collars adapted to operate singly on said bell-crank lever, substantially as described.

GEORGE BROWN.
EMIL DICK.

Witnesses:
SANFORD P. RECORD,
CORNELIA PULSIFER.